(12) United States Patent  
Bai

(10) Patent No.: US 7,684,588 B2  
(45) Date of Patent: Mar. 23, 2010

(54) SYSTEM AND METHOD FOR PROVIDING ROBUST INFORMATION TAGS TO IMAGE FILES

(75) Inventor: Yingjun Bai, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 945 days.

(21) Appl. No.: 11/471,639

(22) Filed: Jun. 21, 2006

(65) Prior Publication Data

US 2007/0296993 A1 Dec. 27, 2007

(51) Int. Cl.
*G06K 9/00* (2006.01)

(52) U.S. Cl. .................... 382/100; 358/1.3; 358/1.9; 358/3.28

(58) Field of Classification Search ............. 382/100; 358/1.3, 1.9, 3.28
See application file for complete search history.

(56) References Cited

U.S. PATENT DOCUMENTS

2003/0179398 A1* 9/2003 Takano et al. ............... 358/1.9
2004/0257625 A1* 12/2004 Tonami ...................... 358/3.28

* cited by examiner

*Primary Examiner*—Tom Y Lu
(74) *Attorney, Agent, or Firm*—Pillsbury Winthrop Shaw Pittman LLP

(57) ABSTRACT

A system that generates an electronically readable image file that represents an image. In one embodiment, the system comprises an image input, an encoding module, and a tag module. The image input obtains color information representative of an image. The encoding module encodes the color information representative of the image into an image file by encoding the color information into a format associated with the image file. The tag module inserts a tag into the image file, wherein the tag is an object to be rendered, and conveys information about the generation of the image file.

20 Claims, 3 Drawing Sheets

SYSTEM AND METHOD FOR PROVIDING ROBUST INFORMATION TAGS TO IMAGE FILES

FIELD

The application relates to including information in image files about the generation of said images files, and/or the use of such information in downstream processing and/or output of image files.

BACKGROUND

Typically, information about the generation of an image file may be useful in downstream processing of the image file in order to provide an output copy of an image represented by the image file with an enhanced precision. For instance, in the context of document reproduction, various aspects of the generation of an image file may be used to produce a "faithful copy" of the image represented by the image file.

For example, information related to a capture mode (e.g., document, picture, etc.) used in generating an image file representing an image of a scanned original may be used to enhance reproduction of the image. Conventional systems do not provide for access to this type of information when the image is reproduced. Consequently, the grayscale used to output a copy of the scanned original may not correspond to the grayscale used to capture the image. This may degrade the output of the copy because when the grayscales do not correspond, the reproduction of shades and colors in the copy may be compromised. This may be observed, for instance, when a black and white image (e.g., a scanned document) is output as a color image.

As another example, image capture devices (e.g., scanners in the context of document reproduction) may generate image files with systematic inaccuracies. These systematic inaccuracies may run across a type of device (e.g., stand alone scanners, etc.), across substantially all of the devices manufactured by a particular manufacturer, across one or more particular models of devices, systematic inaccuracies unique to individual devices (e.g., due to inaccurate calibration, etc.). Typically, these systematic inaccuracies may not be accounted for when outputting copies of the images represented by the generated image files. Thus, the copies may be output including distortion caused by the systematic inaccuracies.

Information about the generation of image files is generally not included in the image files in part because conventional mechanisms for making such information available for downstream processing include appending the information to the image file as non-image meta-data. This is only marginally effective because information appended to the image file in this manner is not "robust," as conversion between file formats will usually result in the loss of the information. Accordingly, a robust mechanism and process that enables inclusion of information about the generation of an image file in the image file for downstream processing is needed.

It should be appreciated that although some of the drawbacks associated with the generation of image files using conventional devices has been discussed above with respect to the context of document reproduction, these and other considerations also apply to the generation of image files in other contexts. For example, similar drawbacks may be associated with the generations of image files in the context of biometric imaging devices (e.g., fingerprint scanners, retinal scanners, etc.), photographic imaging devices, mobile devices, and/or other contexts.

SUMMARY

One aspect of the disclosure relates to a system that generates an electronically readable image file that represents an image. In one embodiment, the system comprises an image input, an encoding module, and a tag module. The image input obtains color information representative of an image. The encoding module encodes the color information representative of the image into an image file by encoding the color information into a format associated with the image file. The tag module inserts a tag into the image file, wherein the tag is an object to be rendered or processed, and conveys information about the generation of the image file.

Another aspect of the disclosure relates to a system that outputs a copy of an image based on an electronically readable image file. In one embodiment, the system comprises an image processing module, a tag module, and an output device. The image processing module renders an image from color information that represents the image, the color information being encoded in a previously generated, electronically readable image file. In some instances, the image file includes a tag that has been inserted as an object such that the tag is rendered or processed by the image processing module with the encoded color information. The tag module determines information about the generation of the image file from the rendered or processed tag. The output device outputs a copy of the image based on instructions generated by the image processing module. In some instances, the image processing module generates the instructions for the output device based on (i) the color information that represents the image, and (ii) the information about the generation of the image file determined by the tag module.

Another aspect of the disclosure relates to a method of generating an electronically readable image file that represents an image. In one embodiment, the method comprises obtaining color information representative of an image, encoding the color information representative of the image into an image file by encoding the color information into a format associated with the image file, and inserting a tag into the image file, wherein the tag is an object to be rendered or processed, and conveys information about the generation of the image file.

Other object, features, and advantages of the embodiments described herein will become apparent from the following detailed description, the accompanying drawings, and the appended claims.

DETAILED DESCRIPTION

Figure 1:
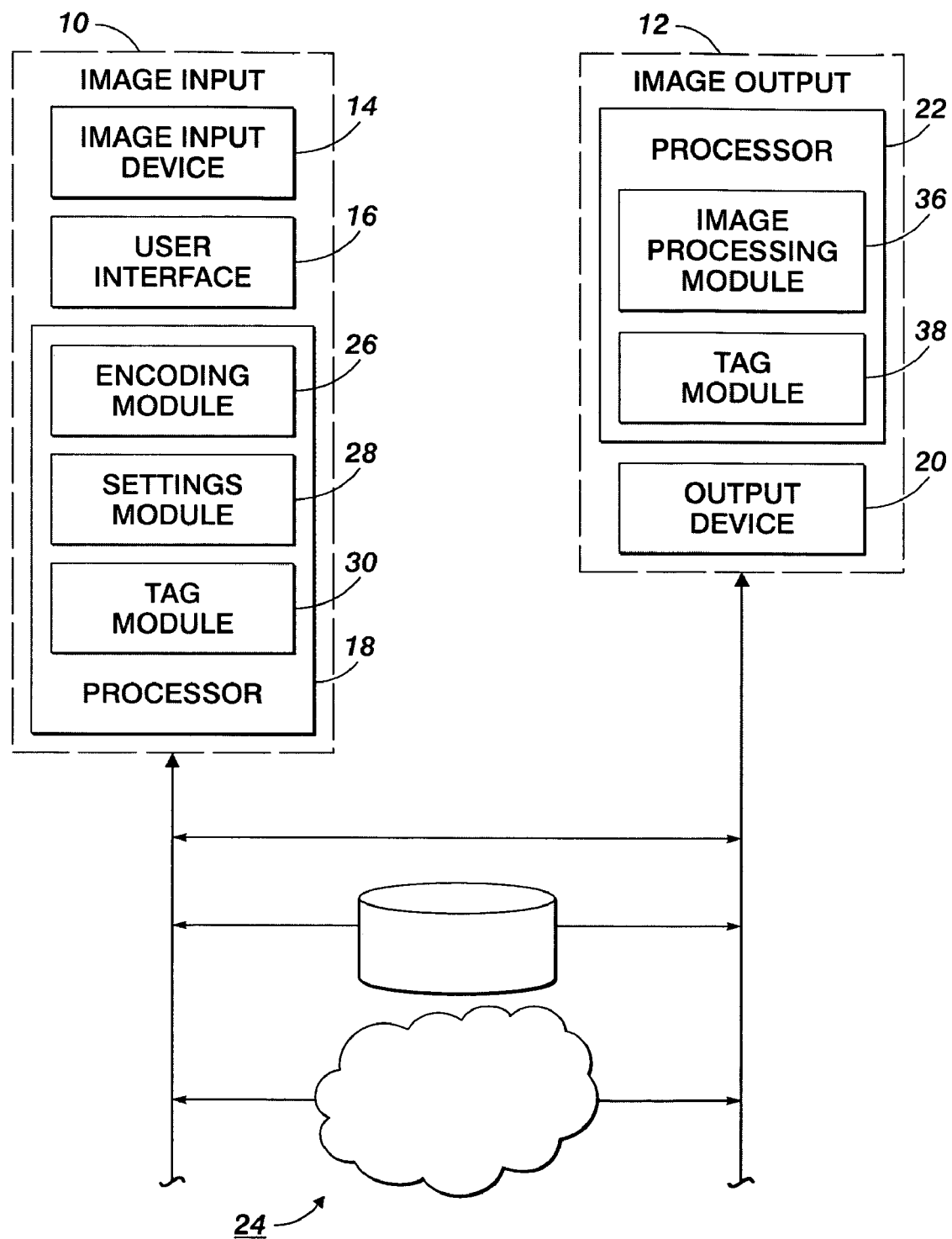
FIG. 1 is an exemplary illustration of an image input system and an image output system.

FIG. 1 illustrates an image input system 10 in communication with an image output system 12. Image input system 10 includes an input device 14, a user interface 16, and a processor 18. Image output system 12 includes an output device 20 and a processor 22. Image input system 10 and image output system 12 are operatively coupled via a communication link 24. Communication link 24 includes any medium (or media) that enable information to be exchanged between image input system 10 and image output system 12. For example, communication link 22 may include a discrete connection, an electronically readable storage medium (e.g., a CD-ROM, a DVD-ROM, a solid-state memory device, a floppy disk, etc.), a network, or other media. In one embodiment, image input system 10 and image output system 12 are included within a single reprographic device. In another embodiment, image input system 10 and image output system 12 are separate and distinct systems.

Image input system 10 is capable of generating an image file that is representative of an image. Input device 14 of image input system 10 includes a device capable of capturing the image by generating color information that represents the captured image. For instance, the color information may include a set of signals that represent the colors present in the image on a pixel by pixel basis. Processor 18 receives the color information that represents the captured image from input device 14 and generates an image file that includes the color information. The image file is generated in a predetermined format. For example, the image may be generated in a PDF format, a TIFF format, a JPEG format, a GIF format, or another format.

In the image input system 10 of FIG. 1, the capture of the image by input device 14 and/or the generation of the image file by processor 18 are controlled by user interface 16. This control of input device 14 and/or processor 18 is based on user adjustable settings that are adjustable by a user via user interface 16. For instance, the one or more settings may include a contrast, a brightness, a color setting (e.g., black and white, color, etc.), a resolution, an image file format, a capture mode (e.g., picture, text, mixed, etc.), and/or other settings. User interface 16 may include one or more of a touch-screen, a touch-pad, a button, a knob, a lever, a switch, a keypad, a joystick, a mouse, a dial, and/or other devices capable of receiving input from a user.

It should be appreciated that by adjusting the settings, the user adjusts the representation of the image provided by the image file. Additionally, other factors may impact the representation of the image provided by the image file. For example, a type of input device (e.g., a scanner), a make/model of the input device, a calibration setting of the input device, and/or other factors may impact the representation of the image provided by the image file. The inclusion of information related to some or all of these factors in the image file enables the image to be output more precisely downstream from image input system 10 (e.g., by image output system 12). Thus, processor 18 includes information about the generation of the image file (e.g., some or all of the factors discussed above) in the image file so that the information can be used during image output.

In some embodiments, input device 14, input interface 16, and processor 18 are integrally formed within a single device. In other embodiments, some or all of these components are formed separately from each other and are operatively connected via a communication link. For example, in one embodiment, input device 14, input interface 16, and processor 18 are all included within a single scanner. In another embodiment, input device 14 is a stand-alone scanner, and input interface 16 and processor 18 are disposed in a computer that is connected to the scanner to control the scanner and receive color information therefrom. Other combinations and configurations of these components exist.

As can be seen in FIG. 1, processor 18 executes an encoding module 26, a settings module 28, and a tag module 30. Modules 26, 28, and 30 may be implemented in software; hardware; firmware; some combination of software, hardware, and/or firmware; and/or otherwise implemented. It should be appreciated that although modules 26, 28, and 30 are illustrated in FIG. 1 as being co-located within a single processing unit, processor 18 may include multiple processing units, and that some of these processing units may be located remotely from each other. In such embodiments, one or more of modules 26, 28, and 30 may be located remotely from the other modules and operative communication between the modules may be achieved via one or more communication links.

In one embodiment, encoding module 26 receives the color information that represents the image from input device 14 and encodes the color information into the image file. Settings module 28 controls the generation of the image file in accordance with the system settings of image input system 10. For instance, the system settings may include one or more user adjustable settings, one or more calibration settings determined during a calibration of image input system 10, and/or other settings. Tag module 30 inserts a tag into the image file that conveys information about the generation of the image file. The tag is inserted into the image file as image information that will be rendered or processed along with the color information that has been encoded in the image file any time that the image file is rendered. The tag is inserted into the image file such that it is the first object to be rendered or processed whenever the image file is rendered (e.g., for output, etc.). The tag may be inserted as any type of object or image information that will be rendered. For example, in one embodiment, the image file has been in encoded in PDF format, and the tag is inserted as a mask. In another embodiment, the tag may be inserted into the image file as a small JPEG object. The tag conveys information about the generation of the image file based on its properties.

For instance, the color of the tag may correspond to information about the generation of the image file. More specifically, in one embodiment, the color of the tag is described in a three-dimensional color-space (e.g., RGB, CMY, etc.), and the position of the color of the tag on each axis of the color-space corresponds to a different piece of information about the generation of the image file. In another embodiment, the color corresponds to a singe piece of information (e.g., an input device model, an input device identification, different user adjustable settings, different calibration settings, etc.). In embodiments in which the color of the tag corresponds to information about the generation of the image file, the tag may be inserted into the image file such that it is outside the "field of view," or the portion of the image rendered from the image file that will be output. This prevents the insertion of the tag from obscuring the color information encoded in the image file that represents the image.

As another example of how the tag can convey information about the generation of the image file, the position of the tag with respect to the image represented in the image file may correspond to the information about the generation of the image file. More specifically, in one embodiment, the image represented by the image file is represented in a two-dimensional space defined by two axes, and the position of the tag with respect to each axis in the two dimensional space corresponds to a different piece of information. In another embodiment, the position of the tag corresponds a single piece of information. In one embodiment in which the position of the tag with respect to the image corresponds to information about the generation of the image file, the tag is transparent (e.g., "white") so that even if the tag is positioned over the image itself, the tag will not obscure the image represented by the color information encoded in the image file. It should be appreciated that this embodiment is effective because even though the color of the tag object is not perceptible to the eye in an image rendered from the image file, the processing module that renders the object will still be aware of the location, size, and/or shape of the transparent tag object as it is rendered.

As yet another example of how the tag can convey information about the generation of the image file, the size and/or shape of the tag that is inserted may correspond to the information about the generation of the image file. Other properties of the tag may also be implemented to convey information about the generation of the image file.

In the implementation shown in FIG. 1, the image file is provided from image input system 10 to image output system 12 via communication link 24. As was stated above, image output system 12 includes a processor 22 and an output device 20. Image output system 12 is capable of receiving the image file and outputting a copy of the image based on the image file. In one embodiment, processor 22 receives the image file, renders the image from the color information encoded in the image file, and generates instructions for the output device to output the copy of the rendered image.

In some embodiments, processor 22 and output device 20 are integrally formed within a single device. In other embodiments, these components are formed separately from each other and are operatively connected via a communication link. For example, in one embodiment, processor 22 and output device 20 are included within a single printer. In another embodiment, output device 20 is a stand-alone printer, and processor 22 is disposed in a computer that is connected to the printer to control the printer and the output of images therefrom. Other combinations and configurations of these components exist.

As can be seen in FIG. 1, processor 22 executes an image processing module 36 and a tag module 38. Modules 36 and 38 may be implemented in software; hardware; firmware; some combination of software, hardware, and/or firmware; and/or otherwise implemented. It should be appreciated that although modules 36 and 38 are illustrated in FIG. 1 as being co-located within a single processing unit, processor 22 may include multiple processing units and that some of these processing units may be located remotely from each other. In such embodiments, modules 36 and 38 may be located remotely from each other, and that operative communication between the modules may be achieved via a communication link.

In one embodiment, image processing module 36 renders the image represented by the image file from the color information encoded in the image file. As used herein, the term "render" refers to the unpacking of image information from the image file to recreate the image represented by the image file. Rendering may occur to enable the image to be output (e.g., as a printed copy, for display on a screen, etc.), or rendering may occur for the purpose of analyzing the image and/or color information encoded in the image file. As was mentioned above, in one embodiment, the tag has been inserted into the image file such that it is the first object that is rendered or processed by image processing module 36. In other embodiments, the tag is inserted such that it is rendered or processed in another predetermined "spot" in the rendering of the image file (e.g., last, etc.). However, placing the tag in the image file to be rendered or processed first may facilitate the use of the information conveyed by the tag in rendering/processing other color information encoded in the image file.

As the tag is rendered or processed, tag module 38 detects the presence of the tag in the rendered information, and determines the information about the generation of the image file that is conveyed by the tag. Tag module 38 then provides this information to image processing module 36. Image processing module 36 generates instructions for output device 20 to output a copy of the image based on the rendered color information that represents the image, and the information about the generation of the image file determined by tag module 38.

As was mentioned above, the information about the generation of the image file conveyed by the tag can be implemented in producing a copy of the image represented in the image file with enhanced precision. For example, in one embodiment, the tag conveys that the image file was generated from a black and white original. Without the information conveyed by the tag, image processing module 36 would process the image file as a gray process output. However, in one embodiment in which the tag conveys that the image file is black and white, image processing module 36 deploys a special color table that has pure K near its neutral axis so that the output of output device will be a pure K print copy of the image represented by the image file.

As another example of the information that may be conveyed by the tag, in one embodiment, the tag may identify a specific input device (e.g., a scanner associated with a specific reprographic system) connected to a network. In this embodiment, the network has access to a plurality of reprographic systems (including input devices and output devices associated with the reprographic systems), and a plurality of images that have been previously input to and/or output by the networked reprographic systems. In order to enhance the precision with which copies of the plurality of images are output from the networked reprographic systems, the information conveyed by tags inserted with the images in image files is used. For example, based on the identification of an input device conveyed by a tag previously inserted in an image file, a specific output device (e.g., the output device of the same networked reprographic system, another output device associated with the network, etc.) is designated for outputting a copy of the image represented by the image file.

It should be appreciated that these examples of uses for information conveyed by tags inserted in image files are exemplary only, and are not intended to limit the scope of this description in any way. In other words, other uses and implementations for information conveyed by tags inserted in image files are contemplated.

Figure 2:
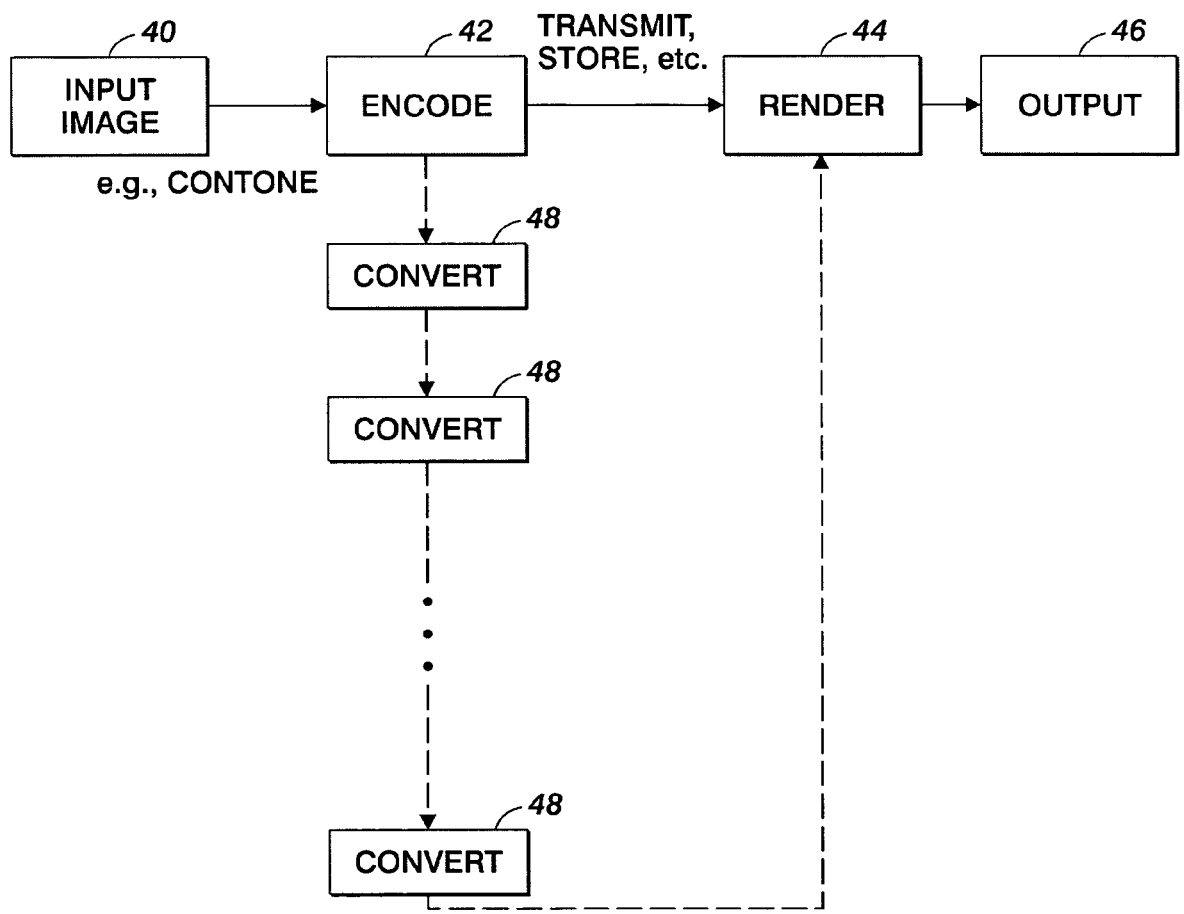
FIG. 2 is an exemplary flowchart for an image file, from generation to the outputting of a copy of an image represented by the image file.

FIG. 2 illustrates an exemplary flow path for an image file that represents an image, from generation to the outputting of a copy of the image. At a first operation 40 the image is input, and color information representing the image (e.g., contone information) is generated. In one embodiment, operation 40 is performed by an input device similar to input device 14, in the manner described above.

At an operation 42, the color information representing the image is encoded into the image file according to a predetermined format (e.g., PDF format, TIFF format, JPEG format GIF format, etc.). At operation 42 a tag that conveys information about the generation of the image file is also inserted into the image file. In one embodiment, operation 42 is performed by a processor similar to processor 18, in the manner described above.

Once the image file has been generated at operations 40 and 42, the image file may then be transmitted, electronically stored, or otherwise transferred and/or implemented. Eventually, the image file passes to an operation 44, where the image file is rendered for output. As the image file is rendered, the tag that was previously inserted into the image file at operation 42 is also rendered or processed and the information conveyed by the tag is determined. In one embodiment, operation 44 is performed by a processor similar to processor 22, in the manner described above.

At an operation 46, a copy of the image represented by the image file is output based on the rendering of the image file at operation 44. The output of the image file at operation 46 is further controlled based on the information conveyed by the tag. In one embodiment, operation 46 is performed by output device 20, in the manner described above.

As can be seen in FIG. 2, between operations 42 and 44, one or more additional operations 48 may be executed on the image file. Operations 48 are format conversions of the color information encoded in the image file. For example, operation 48 may include a conversion from the original file format into a PostScript format by a print driver. If conventional mechanisms are used to "tag" the image file (e.g., appending non-image meta-data to the image file at generation), then this information is typically lost during these conversions. However, in the implementation illustrated in FIG. 2, since the tag inserted in the image file at operation 42 is inserted in the image file as information to be rendered, the tag will survive operation 48, thus enabling the information conveyed by the tag to be utilized at operations 44 and 46 even in instances in which conversions between image file formats (e.g., operation 48) are executed on the image file between operations 42 and 44.

Figure 3:
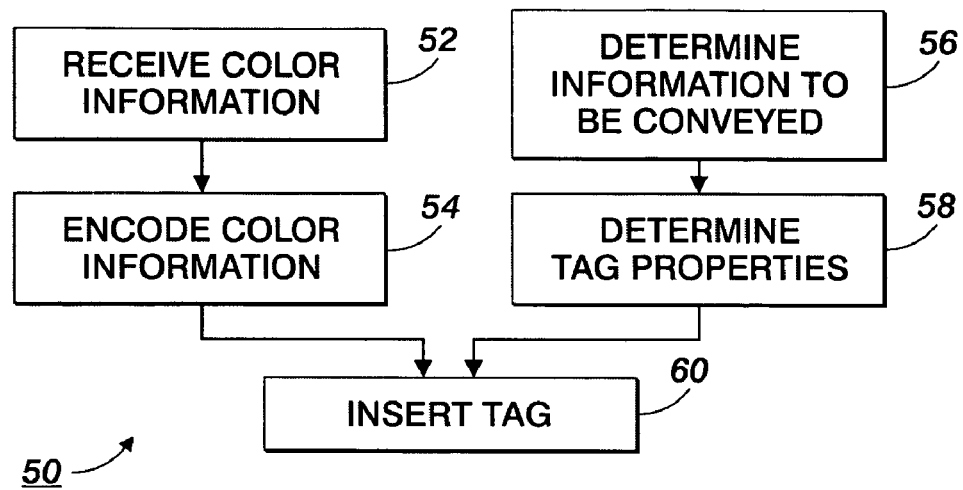
FIG. 3 is an exemplary illustration of a method of generating an electronically readable image file that represents an image.

FIG. 3 illustrates a method 50 of generating an electronically readable image file that represents an image. Method 50 includes a step 52 at which color information that represents the image is received. At a step 54, the color information received at step 52 is encoded into a predetermined format. At a step 56, information to be conveyed by a tag is determined. At a step 58, one or more properties of the tag is determined based on the information determined at step 56. At a step 60, the tag (with the property(ies) determined at step 58) is inserted into the image file. In one embodiment, some or all of steps 52, 54, 56, 58, and 60 may be performed by processor 18, as was described above.

Figure 4:
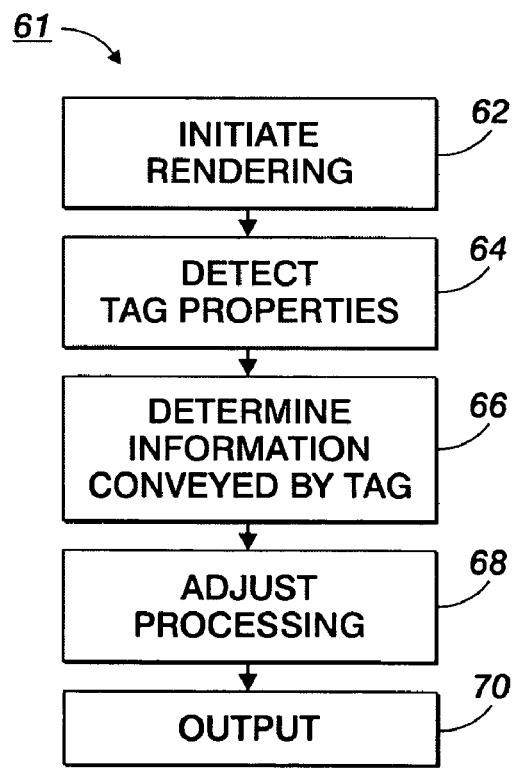
FIG. 4 is an exemplary illustration of a method of outputting a copy of an image based on an electronically readable image file.

FIG. 4 illustrates a method 61 of outputting a copy of an image based on an electronically readable image file. As can be seen in FIG. 4, method 60 includes a step 62 at which a rendering of information encoded in the image file is initiated. At a step 64, one or more properties of a tag present in the rendered information are determined. At a step 66, information conveyed by the tag about the generation of the image file is determined. The information is determined based on one or more of the properties of the tag determined at step 64. At a step 68, the processing of the information encoded in the image file is adjusted based on the information determined at step 66. At a step 70, a copy of the image is output in accordance with the information determined/provided in one or more of the previous steps. In one embodiment, some or all of steps 62, 64, 66, and 68 may be performed by processor 22, as was set forth previously. In one embodiment, step 70 may be performed by output device 20.

While the subject matter of this application has been described in conjunction with the specific embodiments outlined above, it is evident that many alternatives, modifications and variations will be apparent to those skilled in the art. Accordingly, the preferred embodiments as set forth above are intended to be illustrative, not limiting. Various changes may be made without departing from the spirit and scope of the invention as defined in the following claims.

What is claimed is:

1. A system that generates an electronically readable image file that represents an image, the system comprising:
an image input that obtains color information representative of an image; and
one or more processors configured to execute computer program modules, the computer program modules comprising:
an encoding module configured to encode the color information representative of the image into an image file by encoding the color information into a format associated with the image file; and
a tag module configured to insert a tag into the image file as a tag object in the image represented by the image file such that rendering the image from the image file results in the tag object being rendered within the image, wherein the tag object conveys information about the generation of the image file.

2. The system of claim 1, wherein the tag module is configured such that the color of the tag object when the image is rendered from the image file conveys information about the generation of the image file.

3. The system of claim 1, wherein the tag module is configured such that the position of the tag object in the image represented by the image file conveys information about the generation of the image file.

4. The system of claim 1, wherein the tag module is configured such that the size of the tag object in the image represented by the image file conveys the information about the generation of the image file.

5. The system of claim 1, wherein the tag module is configured such that the tag object conveys information about a scanner used to obtain the color information representative of the image.

6. The system of claim 5, wherein the tag module is configured such that the tag object conveys a model identification of the scanner.

7. The system of claim 5, wherein the tag module is configured such that the tag object conveys an identification of the scanner.

8. The system of claim 5, wherein the tag module is configured such that the tag object conveys information regarding a user-selectable setting of the scanner.

9. The system of claim 5, wherein the tag module is configured such that the tag object conveys information regarding a calibration setting of the scanner.

10. A system configured to output a copy of an image based on an electronically readable image file, the system comprising:
an electronic storage medium configured to store a previously generated, electronically readable image file, wherein the image file includes encoded color information that represents an image, and wherein image file further includes a tag that has been inserted into the image file as a tag object in the image represented by the image file;
one or more processors configured to execute computer program modules, wherein the computer program modules comprise:
an image processing module configured to render the image from the image file such that the image includes the tag object; and
a tag module that determines information about the generation of the image file from the rendered tag object in the image rendered by the image processing module; and
an output device that outputs a copy of the rendered image based on instructions generated by the image processing module, wherein the image processing module generates the instructions for the output device based on (i) the rendered image, and (ii) the information about the generation of the image file determined by the tag module.

11. The system of claim 10, wherein the rendered tag object conveys information about a scanner used to obtain the color information representative of the image.

12. A computer-implemented method of generating an electronically readable image file that represents an image, wherein the method is implemented in a system comprising one or more processors executing computer program modules, the method comprising:

obtaining, on an electronic storage medium accessible to the one or more processors, color information representative of an image;

executing, on the one or more processors, one or more computer program modules configured to encode the color information representative of the image into an image file by encoding the color information into a format associated with the image file;

executing, on the one or more processors, one or more computer program modules configured to insert a tag into the image file as a tag object in the image represented by the image file such that rendering the image from the image file results in the tag object being rendered within the image, wherein the tag object conveys information about the generation of the image file.

13. The method of claim 12, wherein the color of the tag object in the image conveys information about the generation of the image file.

14. The method of claim 12, wherein the position of the tag object in the image represented by the image file conveys information about the generation of the image file.

15. The method of claim 12, wherein the size of the tag object in the image conveys the information about the generation of the image file.

16. The method of claim 12, wherein the tag object conveys information about a scanner used to obtain the color information representative of the image.

17. The method of claim 16, wherein the tag object conveys a model identification of the scanner.

18. The method of claim 16, wherein the tag object conveys an identification of the scanner.

19. The method of claim 16, wherein the tag object conveys information regarding a user-selectable setting of the scanner.

20. The method of claim 16, wherein the tag object conveys information regarding a calibration setting of the scanner.

* * * * *